April 29, 1924.

J. PAVELKA ET AL

DEVICE FOR LOCATING INDEX CARDS

Filed May 22, 1919    6 Sheets-Sheet 1

1,492,530

Inventors
Jos. Pavelka
Jos. Razek
By

April 29, 1924.

J. PAVELKA ET AL 1,492,530

DEVICE FOR LOCATING INDEX CARDS

Filed May 22, 1919

Inventors
Joseph Pavelka
Joseph Razek

April 29, 1924.

J. PAVELKA ET AL 1,492,530

DEVICE FOR LOCATING INDEX CARDS

Filed May 22, 1919       6 Sheets-Sheet 3

Inventors
Joseph Pavelka
Joseph Razek

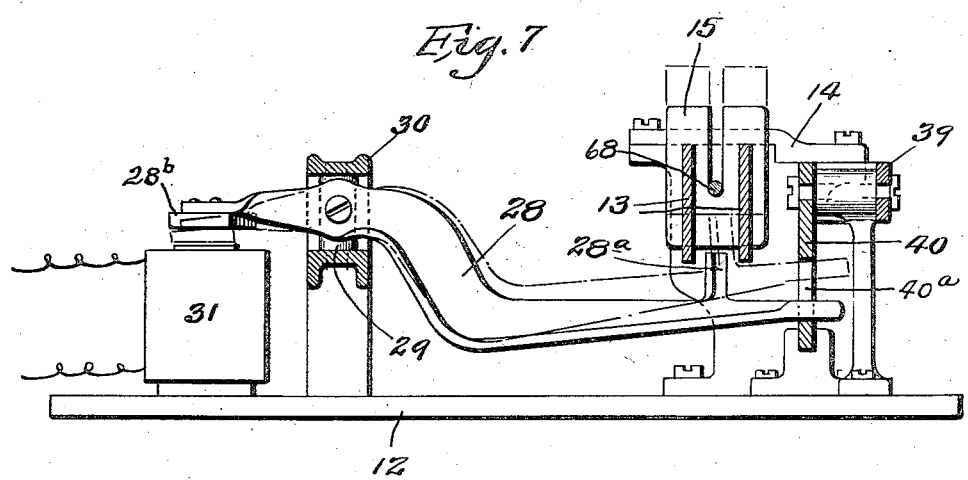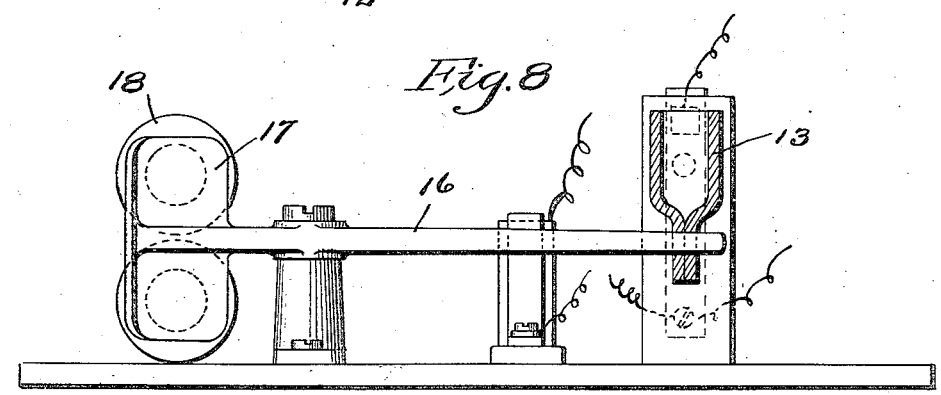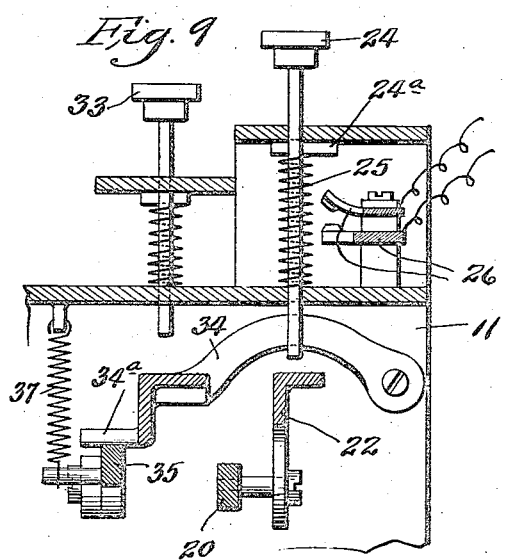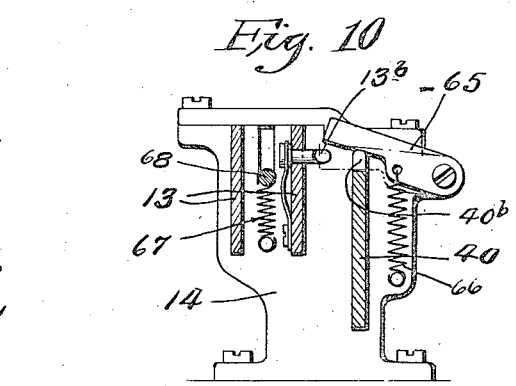

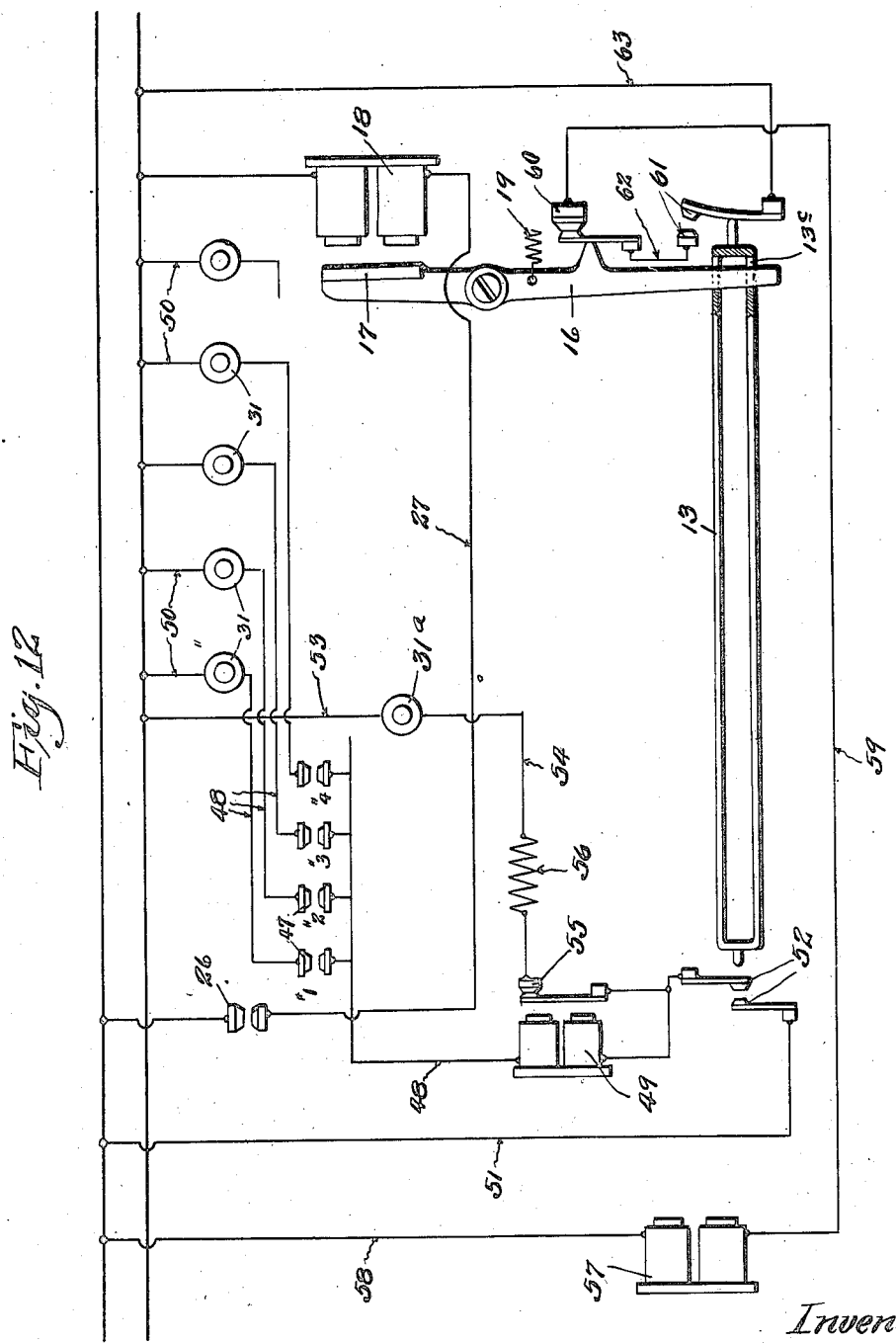

April 29, 1924.
J. PAVELKA ET AL
DEVICE FOR LOCATING INDEX CARDS
Filed May 22, 1919　　6 Sheets-Sheet 6
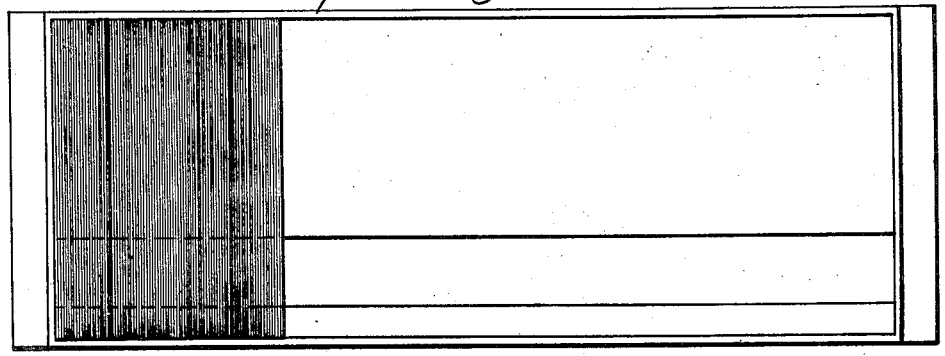
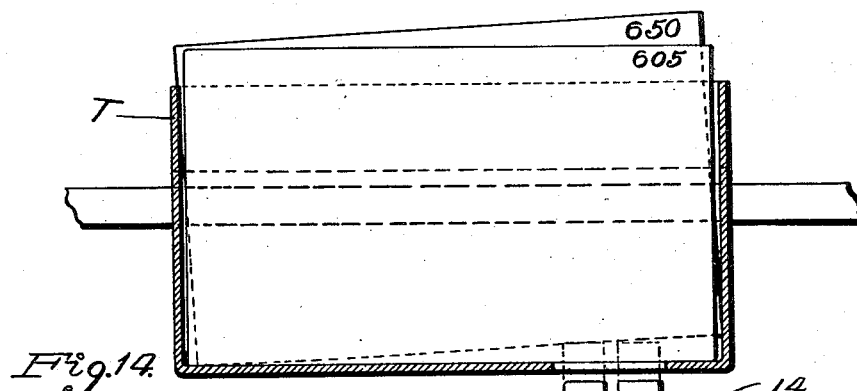
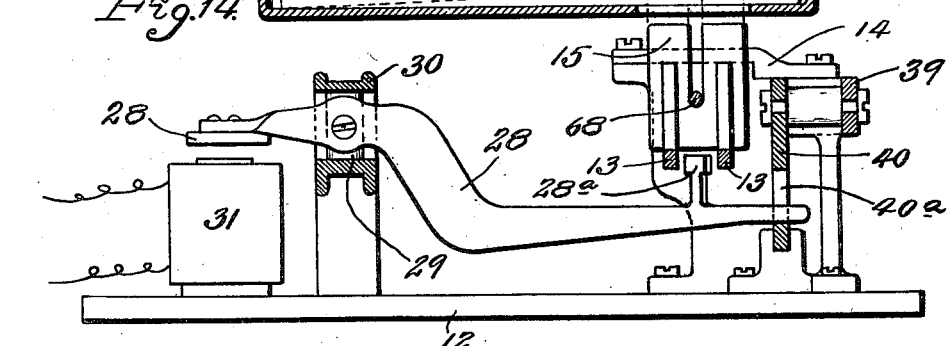
Inventors
Jos. Pavelka
Jos. Razek
By F. R. Cornwall Atty.

Patented Apr. 29, 1924.

1,492,530

UNITED STATES PATENT OFFICE.

JOSEPH PAVELKA AND JOSEPH RAZEK, OF ST. LOUIS, MISSOURI.

DEVICE FOR LOCATING INDEX CARDS.

Application filed May 22, 1919. Serial No. 299,062.

*To all whom it may concern:*

Be it known that we, JOSEPH PAVELKA and JOSEPH RAZEK, citizens of the United States, residing at St. Louis, Missouri, have invented a certain new and useful Improvement in Devices for Locating Index Cards, of which the following is a full, clear, and exact description, such as will enable others skilled in the art to which it appertains to make and use the same, reference being had to the accompanying drawings, forming part of this specification.

Our invention relates to a card-indexing system, i. e., a system in which cards having the desired information are arranged in predetermined order, such as numerical or alphabetical, and are contained in a suitable tray.

Heretofore, if a card having a certain identification mark, such as a number, was desired, it was necessary to closely examine and handle a large proportion of cards. Such method is very slow and entails a great loss of time and causes deterioration of the system on account of wear and soiling of the cards.

The object of our invention is to provide a device cooperating with a card system, and provided with keys, the operation of which will quickly and efficiently produce a card whose identification mark corresponds to the key or keys operated. Furthermore, our device does not employ any operating or restoring handles or motors, as it automatically resets or clears itself after each operation, and which operation depends solely upon the manipulation of the keys.

Another object of our invention is to provide a device which is actuated by electric magnets, and whose electric circuits are controlled by its keys.

A further object of our invention is to provide a device having comparatively few parts and which is economical to manufacture and is positive in operation.

Other objects will be pointed out in the specification and drawings, in which—

Figure 7 is a vertical cross section on the line 7—7 of Figure 1.

Figure 8 is a vertical cross section on the line 8—8 of Figure 1.

Figure 9 is a longitudinal cross section on the line 9—9 of Figure 1.

Figure 10 is a vertical cross section on the line 10—10 of Figure 1.

Figure 11 is a diagrammatic view of certain parts of our device and illustrating the means utilized for selecting and ejecting the desired card from its file.

Figure 12 is a diagrammatic view of electric circuits and contacts employed in our device.

Figure 13 is a top plan view of a tray partly filled with index cards and showing the location of the slot through which the card-engaging means operate.

Figure 14 is a vertical cross-section through our device with the card tray in position thereon.

Figure 15 is a perspective detail view of the longitudinal member designed to carry the card-engaging means.

Figure 1:
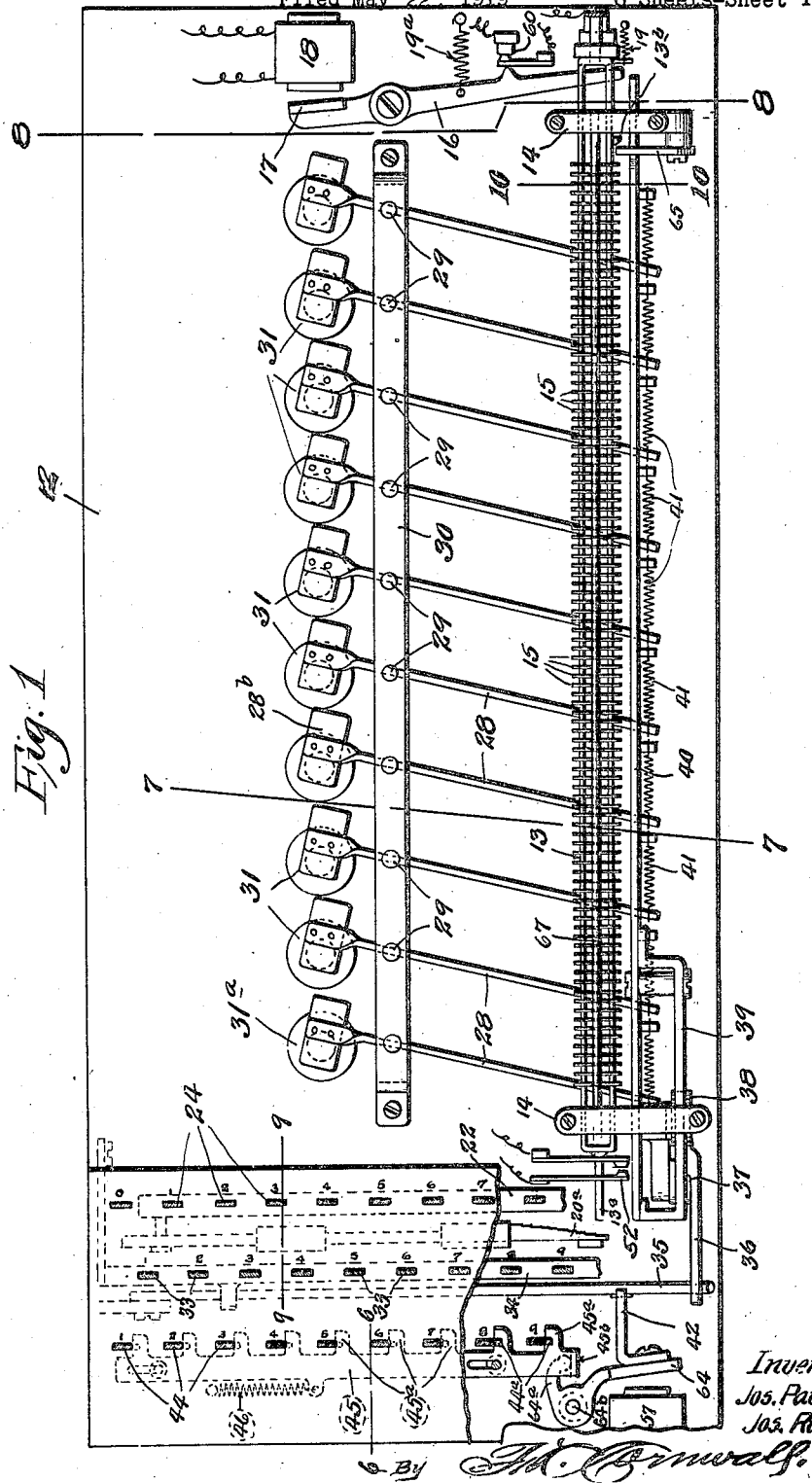
Figure 1 is a top plan view partially in section of our device.
Figure 2:
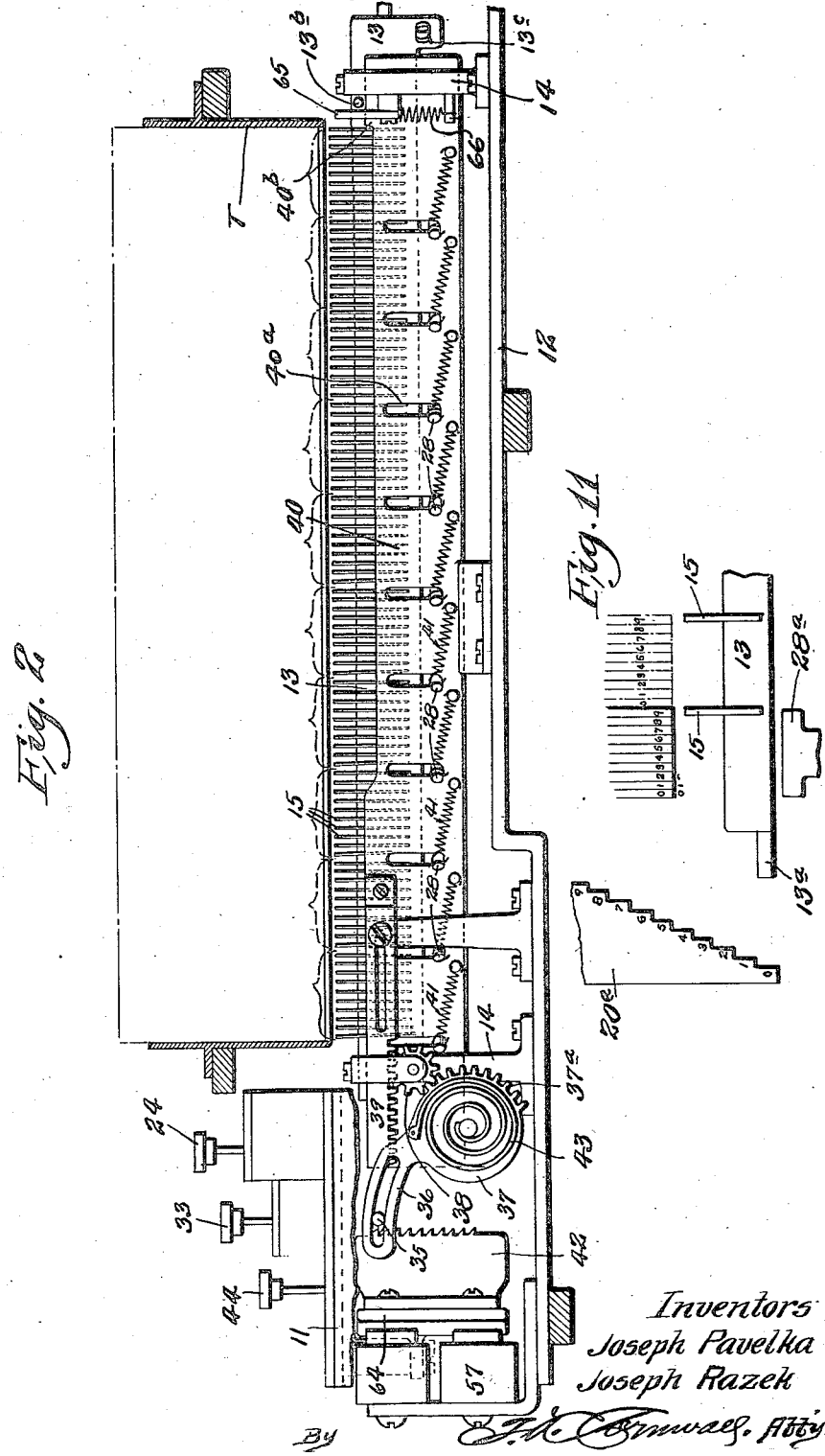
Figure 2 is a side elevation of our device.

Our device as illustrated in the drawings and described in the specification is designed to operate in conjunction with card systems having trays with one thousand cards in each tray, the first tray containing cards from 0 to 999, and the second tray where more than one thousand cards are used, containing cards from 1000 to 1999; the third tray beginning with 2000 and so on, and each tray being marked accordingly.

When more than one tray is used, the device is moved to the tray whose mark corresponds with the number on the card, or a separate device for each tray can be used, if desired.

The bottom of the tray is provided with a slot through which vertically disposed plates are arranged to enter and raise the selected card so that the operator can conveniently examine it for the information which he desires. Keys are arranged in rows of hundreds, tens and units. Suitable means actuated or controlled by said keys is provided for selectively locating and actuating said plates.

The device consists of a housing 11 located in front of the tray T provided with a slot in its bottom and containing the index cards, and of a frame or platform 12 extending rearwardly from the housing under the tray. A longitudinally movable member 13 is mounted in suitable bearings 14 fixed on the platform and said movable member occupying a position below and parallel with the slot formed in the card tray T. Vertically movable plates 15 are carried in the slots formed in the movable member 13 and intersect it at right angles so that the upper edge of each plate is parallel with the lower edges of index cards. The plates 15, of which there are one hundred in all, are equidistant from each other and the distance between any two adjacent plates is equal to the thickness of ten index cards and the thickness of each plate is equal to the thickness of one index card. The movable member 13 carrying plates 15 is adapted to be moved forward by means of a horizontal arm 16 pivoted to platform 12 and one end of which arm engages the rear end of the movable member 13 while the other end is provided with an armature 17 which is adapted to be attracted by an electro-magnet 18 and to move the movable member 13 forward. The circuit of the electro-magnet 18 is controlled by the unit keys. The spring 19 returns the movable member 13 and spring 19$^a$ returns arm 16 to their home positions.

The extent of the forward movement of the movable member 13 is controlled by bar 20 slidable in its bearings 21 and transversely mounted in the housing 11. This slidable bar 20 is so positioned in the housing that one end 20$^a$ of said bar intersects the longitudinal axis of a pin or shoulder 13$^a$ carried by the forward end of said movable member. The inner side of the end 20$^a$ of bar 20, i. e., the side facing the pin 13$^a$ is provided with shoulders or steps, each shoulder being of the thickness of an index card and thus presenting a stop in the path of the forward movement of the bar 13 of various depths. There are ten shoulders marked from 0 to 9.

The opposite end of the bar 20 has a pin which occupies a curved slot formed in the free end of a pivoted arm 22 which lies parallel with and immediately below the row of unit keys and is held in its normal position by means of a spring 23.

The unit keys 24 located in housing 11 are held in their elevated positions by means of compression springs 25, the lower ends of which rest on a part of the housing, while the upper ends bear against a pin or lug 24$^a$ on the shanks of the unit keys. When any one of the unit keys, except the zero key, is depressed, the lower end of the shank of the key will strike the pivoted bar 22, forcing its slotted or free end downwardly, thereby moving the slidable bar 20 forwardly a predetermined distance. The arrangement of various parts just described is such that the depression of a certain key will permit the movable member 13 to move forward a predetermined distance.

The operation of zero key will not operate the slidable bar 20 and the movable member 13 will be permitted to travel full distance, bringing the first plate 15 under the first index card in the tray, which card is blank or is marked a zero card. Each plate 15 is designed to control a series of ten cards, the location of the plate 15 under any one card of its series being determined by the depression of a corresponding unit key.

Figure 3:
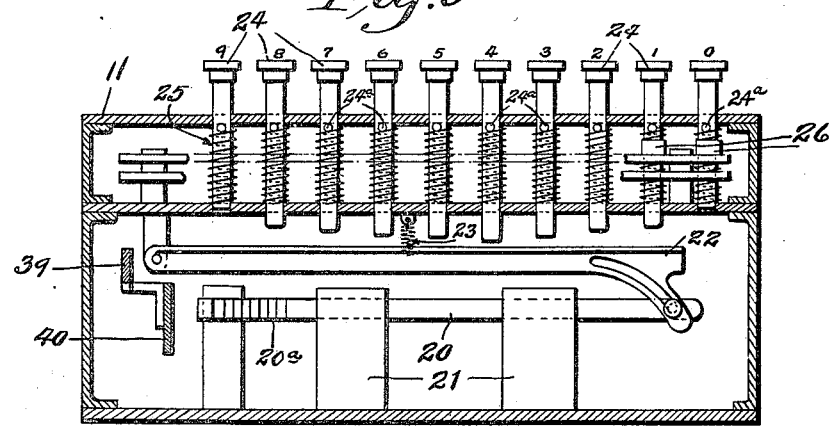
Figure 3 is a vertical cross section through the housing of the device and the unit keys.
Figure 4:
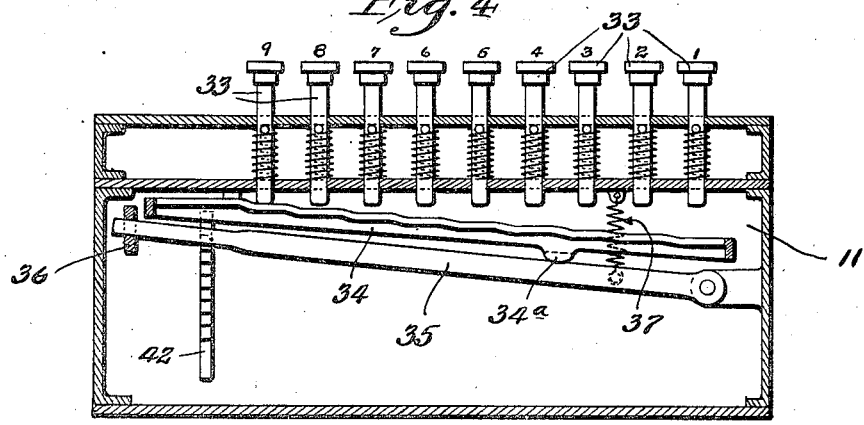
Figure 4 is a vertical cross section through the housing of the device and the tens keys.
Figures 5, 6:
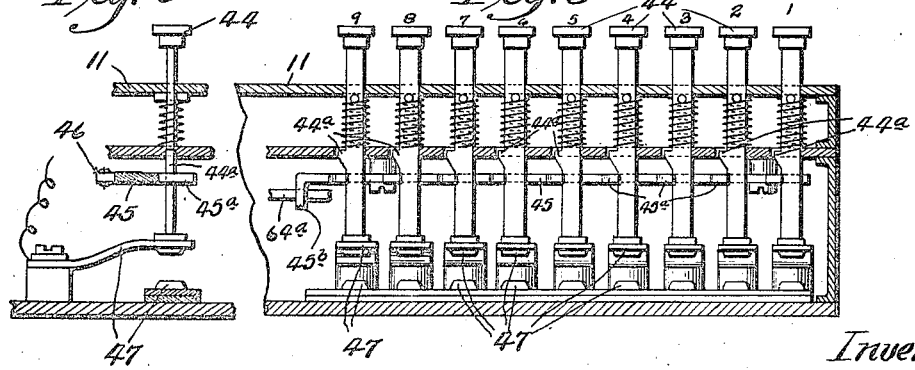
Figure 5 is a vertical cross section through the housing of the device and the hundreds keys.
Figure 6 is a longitudinal cross section through one of the hundreds keys and electrical contacts cooperating therewith.

Contacts 26 which are normally opened are interposed in the circuit 27 connecting electro-magnets 18 with the feed lines and are so located in the housing 11 that they lie in the path of the downward movement of pins 24$^a$ carried by unit keys 24 and the depression of any unit key will bring its corresponding pin 24$^a$ downwardly to bear on and close the contacts 26, thereby completing the circuit 27 and energizing electro-magnets 18. (See Figs. 3, 9 and 12).

Arms 28 are fulcrumed to vertical pins or studs 29 which are pivotally mounted in bearings 30 carried by platform 12. Arms 28 are therefore capable of vertical swinging movement on their own fulcrum and of a horizontal swinging movement by means of the vertical pins or studs 29 pivotally mounted in their bearings. One end of each arm 28 passes under the movable member 13 and has an upwardly projecting shoulder or lug 28$^a$ which normally is spaced away from the plates 15 and the movable member 13. When the arm 28 is actuated, the end provided with shoulder 28$^a$ will move upward and raise one of the plates 15 which enters the tray T through the slot and raises an index card with which said plate is in vertical alignment. The shoulders 28$^a$ are moved upwardly by energized electro-magnets 31 attracting armatures 28$^b$ carried by arms 28. The circuits 32 of electro-magnets 31 are controlled by the hundreds keys.

The plates 15 are divided into ten series of ten plates each, and the arms 28 are arranged in such a way that each arm is capable of being positioned under any one of the plates of its own series.

Normally each arm 28 rests under the first plate of its series and remains in this position when only a unit key is operated, but when a ten key is operated, arms 28 will move under a corresponding plate. For example, the operation of the tens key No. 1 will move each arm one space rearwardly under the second plate of its series: The operation of tens key No. 9 will move each arm nine spaces rearwardly under the tenth plate.

The means for selectively positioning the arms 28 consists of a row of keys 33 located in the housing 11 and held in their normal position by means of expansion springs in similar manner as the unit keys. The shanks of the keys are designed to engage a transverse portion of a bail 34 which latter is pivoted to the sides of the housing and has a finger or projection 34ª resting on a bar 35, one end of which is pivotally connected to one side of the housing, while the opposite end cooperates with a slotted arm 36. A spring 37 connected to the housing and the bar 35 tends to maintain the bail 34 and bar 35 in their home positions. The slotted arm 36 is fixed to a disk 37 loosely mounted on forward bearing 14 and having teeth 37ª which mesh with an idler pinion 38 loosely mounted in bearing 14. Idler 38 is also in mesh with a rack 39 which is fixed to the forward end of a sliding plate 40 located in bearings 14. Plate 40 is parallel with movable member 13 and is provided with vertical slots 40ª and occupying the slots are extreme ends of arms 28. Tension springs 41 are connected to the ends of arms 28 and to the sliding plate and assist the arms to maintain their proper position.

When a tens key is depressed the lower end of its shank bears on a transverse portion of the bail 34 causing the free end of bar 35 to move downwardly. This downward movement is transmitted to the slotted arm 36 causing the disk 37 and idler 38 to rotate and move the rack 39 and the sliding plate 40 to which it is fixed rearwardly. As the arms 28 occupy vertical slots in plate 40, the arms 28 will swing on pivotal supports 29 and thus bring each shoulder 28ª under any one plate 15 of its series. The transverse portion of bail 34 is set at an angle with respect to the ends of the shanks of the keys 33 so that the depression of the tens key will move plate 40 a corresponding distance rearwardly, moving the shoulder 28ª under a predetermined plate. Shoulder 28ª is locked in its position by a locking plate 42 carried by armature 64 which is pivotally mounted in housing 11 by means of a screw 64ᵇ. Locking plate 42 is provided with notches which engage the free end of bar 35 and lock it and parts connected therewith in their moved positions. The spiral spring 43 is connected at one end to disk 37 and the other end to the stationary stud or bearing on which this disk is mounted, so that the rotary motion of said disk will store energy in the spring causing it to restore disk 37 and parts connected therewith to their normal positions when the locking plate 42 is released.

The hundreds keys 44 located in housing 11 are held in their normal or raised position by means of expansion springs. Slidably supported in the housing 11 and parallel with the row of hundreds keys is a latch plate 45 having fingers 45ª projecting rearwardly from the plate and bearing against the shank of each key. A tension spring 46 connected to the housing and the latch plate maintains the plate in its home position. The shanks of the hundreds keys 44 are provided with shoulders 44ª having downwardly inclined cam faces and normally occupying a position above the latch plate. The electric contacts 47 normally held open are located in the housing below and on the vertical axis of the shank of each hundreds key. When a hundreds key is depressed, the inclined face of the shoulder 44ª will engage the finger 45ª and move the latch plate against the force of the spring 46 and at the same time the shank of the key will engage and close electric contacts 47. The downward movement of the key will move the shoulder 44ª out of the path of the finger 45ª and permit the latch plate 45 to move to its home position, thereby locking the key in its depressed position and maintaining the electric contacts closed.

Contacts 47 are interposed in circuits 48 which connect all electro-magnets 41 except electro-magnet 31ª with electro-magnet 49. Electro-magnets 31 are connected to one of the feed lines by wires 50 and electro-magnet 49 is connected to the other of the feed lines through circuit 51. A contact 52, normally held open but adapted to be closed by the forward movement of member 13, is interposed in circuit 51 so that the energization of electro-magnet 49 and electro-magnets 31 can not be accomplished until one of said contacts 47 is closed by the operation of the hundreds key and contact 52 is closed by the forward movement of member 13. Electro-magnet 31ª is connected to one of the feed lines by wire 53 and to contact 52 through circuit 54. Interposed in circuit 54 is a contact 55 normally closed and adapted to be opened to break circuit 54 by the energized electro-magnet 49. A resistance coil 56 whose resistance is greater than the resistance of the electro-magnet 49 is interposed in circuit 54 so that when contact 52 and one of contacts 47 are closed, the current will energize a corresponding electro-magnet 31 and electro-magnet 49, but if contact 52 is closed while contacts 47 remain open, the current will energize electro-magnet 31ª. Electro-magnet 57 is located in housing 11 and connected to one of the feed lines by connection 58; wire 59 connects electro-magnet 57 with contact 60 normally held closed by arm 16.

The contact 61 normally held open by the rear end of member 13 is connected to contact 60 by wire 62 and to the other one of the feed lines by wire 63. These connections and contacts form a complete circuit for electro-magnet 57, which circuit is broken by the rear end of movable member 13 holding contact 61 open. Locking plate 42 is carried by armature 64 pivotally mounted in housing 11 and designed to be attracted by energized electro-magnet 57; armature 64 has an arm 64ª bearing against the downward portion 45ᵇ of latch plate 45. The attraction of armature 64 by energized electro-magnet 57 will move the rocking plate 42 away from arm 35 permitting it to return to its normal position and will cause arm 64ª to move latch plate 45 against the force of spring 46, moving fingers 45ª away from shoulders 44ª of keys 44, releasing the depressed hundreds key and opening closed contact 47. Pivotally mounted on the rear of bearing 14 is an arm 65 whose free end ies in the path of travel of pin 13ᵇ yieldingly carried by the rear end of member 13 and having a beveled portion which causes the pin to yield under forward movement of member 13 and a straight portion which strikes the arm 65 upon the return movement of member 13, thereby preventing member 13 from completing its rearward movement and opening contact 61 until the forward movement of plate 40 brings the raised portion 40ᵇ under arm 65 and raises it away from pin 13ᵇ. Arm 65 is held in its position by spring 66. While member 13 is being detained in its return movement, arm 16 finishes its return movement and closes contact 60. The closing of contact 60 while contacts 61 are closed completes the circuit and electro-magnet 57 is energized, attracts armature 64 and releases arm 35 and key 44 from their locked position. The movement of arm 16 while member 13 is detained is accomplished by elongating the opening 13ᶜ where arm 16 engages member 13 so as to give play to arm 16. The purpose of arm 65 and yielding pin 13ᵇ is to detain member 13 in its return movement a sufficient period of time to permit arm 16 to close contact 60 while contacts 61 are closed and so energize electro-magnet 57.

In the operation of our device, assuming that index card No. 235 is desired. The operator first presses the hundreds key No. 2 which closes its contacts 47 and is locked by latch plate 45. The closing of contacts 47 will complete the circuit of its corresponding electro-magnet 31, but the electro-magnet is not energized as contact 52 is still open. When the operator presses the tens key No. 3, the bail 34 is rocked on its pivots forcing the other end of arm 35 downwardly until arm 35 engages the third notch of the locking plate 42. The slotted arm 36 is moved downwardly a corresponding distance rotating disk 37 and idler 38 and moving the rack 39 and the sliding plate 40 rearwardly until shoulders 28ª occupy positions under the fourth plate of their series. Contact 52 is still open. When the units key No. 5 is pressed the slotted arm 22 is moved downwardly a predetermined distance forcing bar 20 to slide towards the side occupied by movable member 13, and bringing shoulder No. 5 into the path of pin 13ª. Just before completion of the downward stroke of the units key No. 5, contacts 26 are closed permitting electric currents to flow through circuit 27 and energize electro-magnet 18. The energized electro-magnet will attract armature 17 carried by arm 16 causing said arm to swing on its pivot and move the movable member 13 forward until pin 13ª is stopped by shoulder 5 on bar 20. This will position the fourth plate of the third series under a card (No. 235). The shoulders 28ª are of sufficient width to permit this movement of the plates and still retain said plates in the path of the upward movement of shoulders 28ª. When the units key is operated the forward movement of member 13 closes contact 52 energizing electro-magnets 49 and 31. The energization of electro-magnet 31 will attract armature on arm 28, raising the shoulder 28ª which will move the upper portion of plate 15 into the tray, displacing index card No. 235.

As soon as the units key is released, contact 26 will be opened deenergizing electro-magnet 18 and causing member 13 to move rearwardly opening contact 52 and deenergizing electro-magnets 49 and 31. The return movement of arm 16 will be slightly in advance of member 13, and will close contact 60, while contacts 61 are closed, energizing magnet 57 which in turn will release arm 35 and depressed key 44. The weight of arm 28 will return it to its normal position as soon as electro-magnet 31 is deenergized, and plate 15 will be assisted to return to its normal position by means of springs 67 connected to the bearings 14 and to rod 68, which rod occupies vertical slots in said plates 15. Thus, it will be seen that in the operation of our device it is only required to operate the keys and the releasing of the units keys, which are not locked in their depressed position, and are released as soon as the operator removes his fingers from the depressed key, will automatically reset the device for the next operation.

The depression of zero key alone will close contacts 26 and 52, energizing electro-magnets 18 and 31ª. The first card in each tray marked #0 in a tray containing cards from No. 1 to 999, and marked No. 1000 in a tray containing cards from 1000 to 1999, will be displaced by the zero key.

To find card No. 100, hundreds key No. 1 is depressed, closing contacts 47. The zero key is now depressed, which will close contacts 26 and 52 and energize electromagnets 18 and 49 and one of the electro-magnets 31, contact 55 is opened and electro-magnet 31ª 13ᶠ is not energized. The releasing of the zero key opens contacts 26 deenergizing magnet 18 and restoring the device to normal position.

Our device is noiseless in its operation and presents a neat appearance, being compactly built and occupying little space, and is readily applicable to any existing car system, as it does not require the cards to be specially marked or shaped or of special size.

It will be readily understood that minor changes in the size, form and construction of the various parts of our improved device for locating index cards may be made and substituted for those herein shown and described without departing from the spirit of our invention, and we do not wish to be limited to the specific construction described.

What we claim is:

1. The combination with a tray having a slotted bottom and a series of cards supported therein, of movably mounted card-engaging members, keys, electro-magnets controlled by said keys, and means adapted to be actuated by said electro-magnets for actuating said card-engaging members.

2. The combination with a tray having a slotted bottom and a series of cards supported therein, of movably mounted card-engaging members, keys, electro-magnets controlled by said keys for actuating said movable members and means for selectively positioning said movable members.

3. The combination with a tray having a slotted bottom and a series of cards supported therein, of movably mounted card-engaging members, keys, electro-magnets controlled by said keys, arms adapted to be actuated by said electro-magnets for operating said card-engaging members, and means for selectively positioning said arms with respect to said card-engaging members.

4. In a device of the class described, keys, a longitudinally movable member, plates carried by said longitudinally movable member, electro-magnets controlled by said keys and adapted to move said plates in vertical plane, and means for actuating said longitudinally movable member.

5. In a device of the class described, keys, a longitudinally movable member, an electro-magnet adapted to actuate the latter and controlled by said keys, plates carried by said movable member, electro-magnets adapted to move said plates in a vertical plane and controlled by said movable member.

6. In a device of the class described, keys, a longitudinally movable member, means adapted to move forward said longitudinally movable member, a bar actuated by said keys and designed to limit the forward movement of said movable member, plates carried by the movable member, and electro-magnets adapted to move said plates in a vertical plane.

7. In a device of the class described, keys, a longitudinally movable member, an electro-magnet controlled by said keys and adapted to actuate said movable member, plates carried by the latter, electric contacts, electro-magnets controlled by said contacts and adapted to move said plates in a vertical plane, and means for opening and closing said electric contacts.

8. In a device of the class described, the combination with a card-supporting structure and cards supported thereby, of keys, movable card engaging plates, electro-responsive means operated by said keys for actuating said plates, including electric contacts controlling said electro-responsive means, and means for locking said contacts in operative positions.

9. In a device of the class described, the combination with a card-supporting means and cards arranged therein, of keys, movable card engaging plates, electro-responsive means operated by said keys for actuating said plates, including electric contacts controlling said electro-responsive means, means for locking said contacts in closed positions, and an electric magnet for releasing said locking means.

10. In a device of the class described, keys, a longitudinally movable member, an electro-magnet controlled by said keys and adapted to actuate said movable member, plates carried by the latter, arms adapted to be selectively positioned under said plates and designed to raise them, electro-magnets adapted to actuate said arms, means for locking said arms in their selected positions, and an electro-magnet adapted to release said locking means.

11. In a device of the class described, keys, a movable member, plates carried by the latter and adapted to be moved in a vertical plane, an electro-magnet controlled by said keys and adapted to actuate said movable member, and means designed to retard the return movement of said movable member.

12. In a device of the class described, keys, a movable member, plates carried by the latter and adapted to be moved in vertical plane, and an electro-magnet controlled by said keys and adapted to actuate said movable member.

13. The combination with a tray having a longitudinal slot in its bottom and a series of cards supported therein, of means for locating and displacing said cards, keys, electro-magnets adapted to actuate said means, and electric circuits for said electro-magnets and controlled by said keys.

14. In a device of the class described, keys, a longitudinally movable member, an electromagnet controlled by certain of said keys for actuating said movable member, plates carried by the latter, arms adapted to be selectively positioned under said plates, means for selectively actuating certain of said arms whereby the latter causes certain of said plates to move into an engaging position, means for locking said arms in their selected position, and electro-responsive means for releasing said locking means and operable in time relation with said longitudinally movable member.

15. In a device of the class described, keys, a longitudinally movable member, a slidable bar having a multiple shouldered end adapted to be moved by said keys into the path of said longitudinally movable member, and card-engaging members carried by said longitudinally movable member.

16. In a device of the class described, keys, a longitudinally movable member, a slidable bar having a multiple shouldered end adapted to be moved into the path of said longitudinal member by certain of said keys, card-engaging members carried by said longitudinal member, and electro-responsive means controlled by certain others of said keys and adapted to actuate said card-engaging members.

17. In a device of the class described, keys, a longitudinally movable member, a slidable bar having a multiple shouldered end adapted to be moved in the path of said longitudinal member by said keys, card-engaging members carried by said longitudinal member, and electro-responsive means controlled by said keys and adapted to actuate said longitudinal member.

18. In a device of the class described, keys, a longitudinally movable member, card-engaging members carried by the latter, means arranged to actuate said card-engaging members and adapted to be selectively positioned by certain of said keys, and electro-responsive means controlled by certain others of said keys and adapted to actuate said means.

19. In a device of the class described, keys, a longitudinally movable member, card-engaging members mounted therein, means adapted to control the forward movement of said longitudinal member, means arranged to move said card-engaging members in vertical plane, and electro-responsive means controlled by said keys and adapted to actuate the last-mentioned means.

20. In a device of the class described, keys, card-engaging members, means arranged to move said card-engaging members in vertical plane, and electro-magnets controlled by said keys and adapted to actuate said means.

In testimony whereof we hereunto affix our signatures this 14th day of May, 1919.

JOSEPH PAVELKA.
JOSEPH RAZEK.